US008709675B2

(12) United States Patent
Gallet et al.

(10) Patent No.: US 8,709,675 B2
(45) Date of Patent: Apr. 29, 2014

(54) FUEL CELL MODULE, MANUFACTURING METHOD THEREOF AND UNIT CONTAINING SEVERAL OF THE LATTER

(75) Inventors: Damien Gallet, Avignon (FR); Franck Blein, St Avertin (FR); Jean-Luc Sarro, Bourg Saint Andeol (FR)

(73) Assignee: Commissariat a l'Energie Atomique (FR)

( * ) Notice: Subject to any disclaimer, the term of this patent is extended or adjusted under 35 U.S.C. 154(b) by 1699 days.

(21) Appl. No.: 11/666,313

(22) PCT Filed: Oct. 27, 2005

(86) PCT No.: PCT/FR2005/050911
§ 371 (c)(1),
(2), (4) Date: Apr. 25, 2007

(87) PCT Pub. No.: WO2006/048574
PCT Pub. Date: May 11, 2006

(65) Prior Publication Data
US 2009/0130536 A1    May 21, 2009

(30) Foreign Application Priority Data
Nov. 2, 2004  (FR) .................................... 04 52495

(51) Int. Cl.
*H01M 8/24*    (2006.01)
*H01M 2/38*    (2006.01)
*H01M 2/40*    (2006.01)
*H01M 8/10*    (2006.01)
*H01M 8/04*    (2006.01)

(52) U.S. Cl.
USPC ........... 429/466; 429/454; 429/456; 429/458; 429/497; 429/513

(58) Field of Classification Search
USPC .................. 429/466, 454, 456, 458, 497, 513
See application file for complete search history.

(56) References Cited

U.S. PATENT DOCUMENTS 4,876,163 A * 10/1989 Reichner ........................ 429/442
7,396,384 B2 * 7/2008 Barker et al. ..................... 95/55

FOREIGN PATENT DOCUMENTS

| AT | EP1482585 | * 12/2004 | ............. H01M 8/02 |
| AU | WO03/073533 | * 9/2003 | ............. B01D 53/22 |
| EP | WO 2004/093235 A | 10/2004 | |
| JP | 63097656 | 4/1988 | |
| JP | 63129845 | 5/1988 | |
| JP | 01011433 | 1/1989 | |
| JP | 01 267964 | 10/1989 | |
| JP | 01 298647 | 12/1989 | |
| JP | 02 192665 | 7/1990 | |
| JP | WO03/075384 | * 9/2003 | ............. H01M 8/02 |

OTHER PUBLICATIONS

Concentric defined as having a common center http://www.thefreedictionary.com/concentric.*
www.thefreedictionary.com/coaxially.*
International Search Report which issued in PCT/FR05/050911, citing the above references.
Search Report PCT/FR2005/050911 Oct. 27, 2005 in French.
Search Report WO 2004/093235 A1 WIPO.

* cited by examiner

*Primary Examiner* — Helen O Conley
(74) *Attorney, Agent, or Firm* — Baker & Hostetler LLP

(57) ABSTRACT

The fuel cell base module stacking structure has large compactness, very litte ohmic losses and ease as for implementing the seal of the assembly.
It consists of a concentric stack of several fuel cell base cells each consisting on either side of an interconnector (24) sandwiching an anode (21), an electrolyte (22) and a cathode (23), each cell being thereby placed upon each other. The module is completed with two cases for distributing combustible gases. Application to gas fuel cells of the SOFC type.

21 Claims, 4 Drawing Sheets

Figure 2:
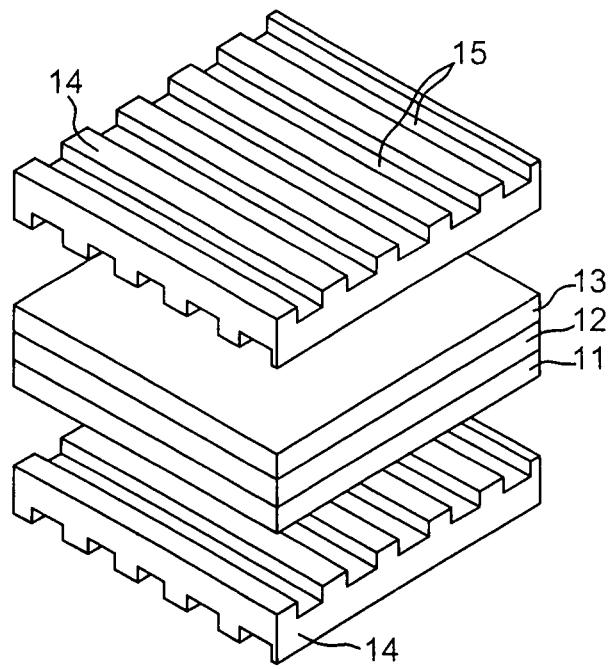

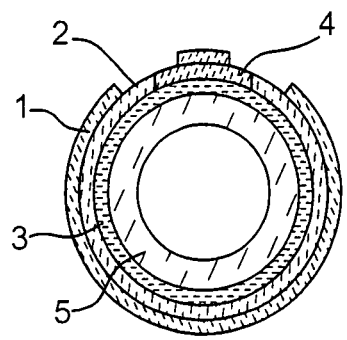
FIG. 1.A
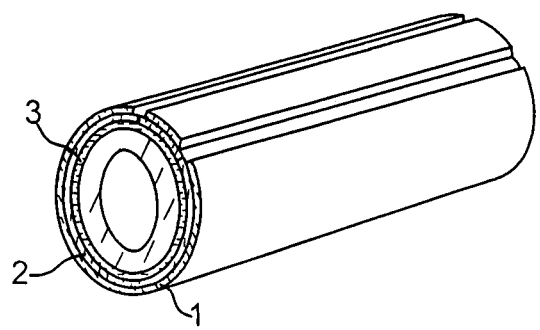
FIG. 1.B
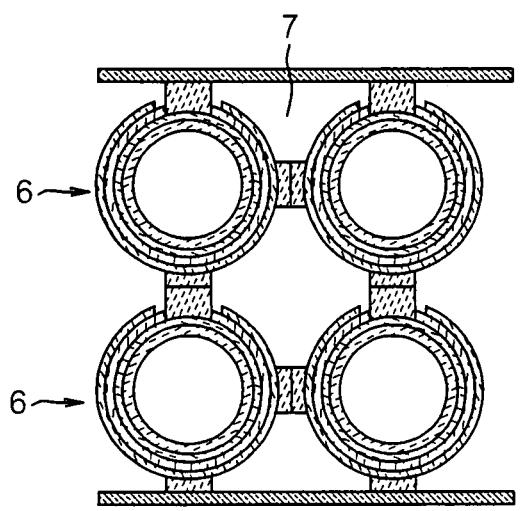
FIG. 1.C

ND UNIT
FUEL CELL MODULE, MANUFACTURING METHOD THEREOF AND UNIT CONTAINING SEVERAL OF THE LATTER

FIELD OF THE INVENTION

The invention relates to fuel cells and, in particular to those which operate at high temperature and are of the solid oxide fuel cell (SOFC) type, but it may also be applied to other families of fuel cells.

It also relates to the manufacturing of such cells and their assembling in order to form a unit of several of these cells.

PRIOR ART AND POSED PROBLEM

SOFC type cells operate with oxygen as an oxidizer and hydrogen as a fuel, or with another combustible gaz, for example of the methane type, and at a temperature between 500 and 1,000° C. These cells consist of a stack of several elementary cells connected through connecting elements, such as interconnectors or bipolar plates. The elementary cells consist in a stack of a cathode, an electrolyte and an anode. The high temperature is required in order to obtain sufficient conductivity of the electrolyte for $O^{2-}$ ions.

Several types of architecture govern the design of these fuel cells; four main ones are taken into account, which are the following:
 a tubular architecture;
 a monolithic architecture;
 a strip architecture;
 a planar architecture.

With reference to FIGS. 1A, 1B and 1C, the tubular architecture is widely known. It appears as a tube either closed or not at one end (see FIG. 1B). As shown in FIG. 1C, several cells 6 are placed inside a chamber 7 and are connected in series and/or in parallel. Referring back to FIG. 1A, oxygen is injected by means of an internal tube not shown, at the bottom of each cell, and flows forward along a cathode 3 while passing through a supporting tube 5 on which the cathode is placed. The fuel is injected outside the cell, into the main chamber 7 (see FIG. 1C), and is therefore in contact with an anode 1 located on the outer surface of an electrolyte 2, itself with a tubular shape since it is placed on the cathode 3. The latter is connected to a connector 4 opening out on the outer surface of the electrolyte 2. The residual gases exit and are possibly mixed in a combustion chamber which provides preheating of the inflowing oxygen.

In such a configuration, no seal needs to be managed. The mechanical strength of the cell is provided by the supporting tube 5 which is porous so that the first fuel may pass through it and be diffused towards the cathode 3. It was then contemplated to suppress this supporting tube 5 and have the cathode 3 provide the mechanical strength of the assembly.

With the cells, once they are connected together in series, it is possible to obtain a desired voltage between current-collecting plates. The connection of the cells 6 in FIG. 1C is a connection in parallel and the desired power may be obtained therewith.

Several drawbacks are related to this tubular structure and are the following:
 the current lines are long, as the current must flow (see FIG. 1C) over the half-tubes, circumferentially; ohmic losses are therefore high;
 the making of the tubes is complex and expensive;
 the bulk performances are low, considering the lost space between the cells; and
 the heat gradient over the length of the tubes, due to the depletion of the reactive gases, is strongly detrimental to the mechanical strength of the latter.

The mechanical strength of this tubular structure may be improved by several techniques and they are the following:
 reducing the size of the tubes in order to reduce stresses;
 reducing the heat gradient by injecting gases at different levels; and
 strengthening the supporting tube;

On the other hand, a reduction in the length of the current lines may also be obtained by:
 reducing the internal resistance of the cell, which implies higher power;
 reducing polarization losses in the electrodes by thinning the anode, made possible by the presence of bridges;
 better compactness due to the flattened cylindrical shape; and
 suppressing the tube supplying air.

However, all these architectures only partly provide an answer to the main drawbacks, which are the poor compactness and high ohmic losses due to the length of the current lines.

With reference to FIG. 2, the planar architecture is very widespread. The stack, therefore a planar stack, consists of two bipolar plates 14 sandwiching a stack successively consisting of an anode 11, an electrolyte 12 and a cathode 13. The bipolar plates 14 act as collectors and also have oriented flow channels 15, for example perpendicularly in order to organize cross-flow of both fuels. Gas supply and discharge is performed by cases positioned on the four side faces of the stack (not shown).

The current lines are reduced because the current only has to flow through the layers in their thickness. Further the compactness of this structure provides it with a certain advantage. On the other hand, seal problems are more significant than in the case of the tubular architecture and need to be handled on the four side faces of the stack of the cells, in order to ensure flow of each of the gases between the inlet and outlet faces, as well as their separation. This is due to the fact that the electrodes are porous. Further, the seal should be provided around the four cases.

To summarize, the planar architecture has good compactness and very reduced current lines but requires a lot of efforts as regards the seal.

SUMMARY OF THE INVENTION

With the purpose of avoiding the aforementioned drawbacks relating to both of these types of fuel cell structures, a first main object of the invention is a fuel cell module with cells of tubular architecture, each cell consisting of a concentric base stack comprising a cathode, an electrolyte and an anode, these cells being connected through interconnectors. This module consists of a concentric stack of several concentric cells and completed with a distribution case on each side.

According to the invention, the distribution cases have means for supplying gas of two kinds, i.e., fuel and oxidizer, and radial channels opening out on a surface on the stack side.

The main embodiment provides that the section of the module should be cylindrical.

This embodiment is advantageously completed with a seal gasket between the case and the stack, except at the distribution ports.

A particularity of the module according to the invention is that the anode and the cathode are porous in order to allow the fuels to be distributed.

A main embodiment of the module provides the use of a distribution plate pierced with holes facing the electrodes to be fed with gas, on either side of the stack, the interconnectors of the latter having longitudinal, shifted and alternating, inlet and outlet fuel distribution channels.

In the case when it is desirable to provide a helicoidal component to the phenomenon, it is advantageous if the interconnectors have a helicoidal shape.

Another main object of the invention is a method for making a module such as the one which has just been summarized, with the purpose that the stack should be in single piece.

According to the invention, the making is carried out by plasma projection from a central tube having the interconnector function, the different successive phases being the following:

projecting either one of the anode and cathode in porous material;
projecting the dense electrolyte;
projecting the second one of the anode and cathode;
projecting an interconnector, the process being renewed as many times as desired to stack cells.

This method is advantageously completed by the fact that, in the case when the interconnectors have to be grooved in order to form longitudinal fuel distribution channels, these channels are blocked before projecting the next layer.

In the case of this method for obtaining a module, the cases are provided in zirconia, in order to withstand corrosion.

LIST OF THE FIGURES

Figure 3:
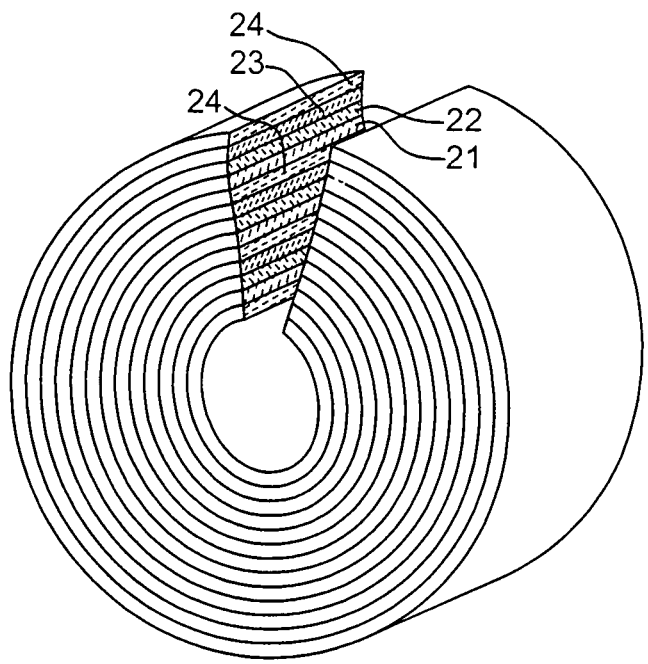
Figure 4:
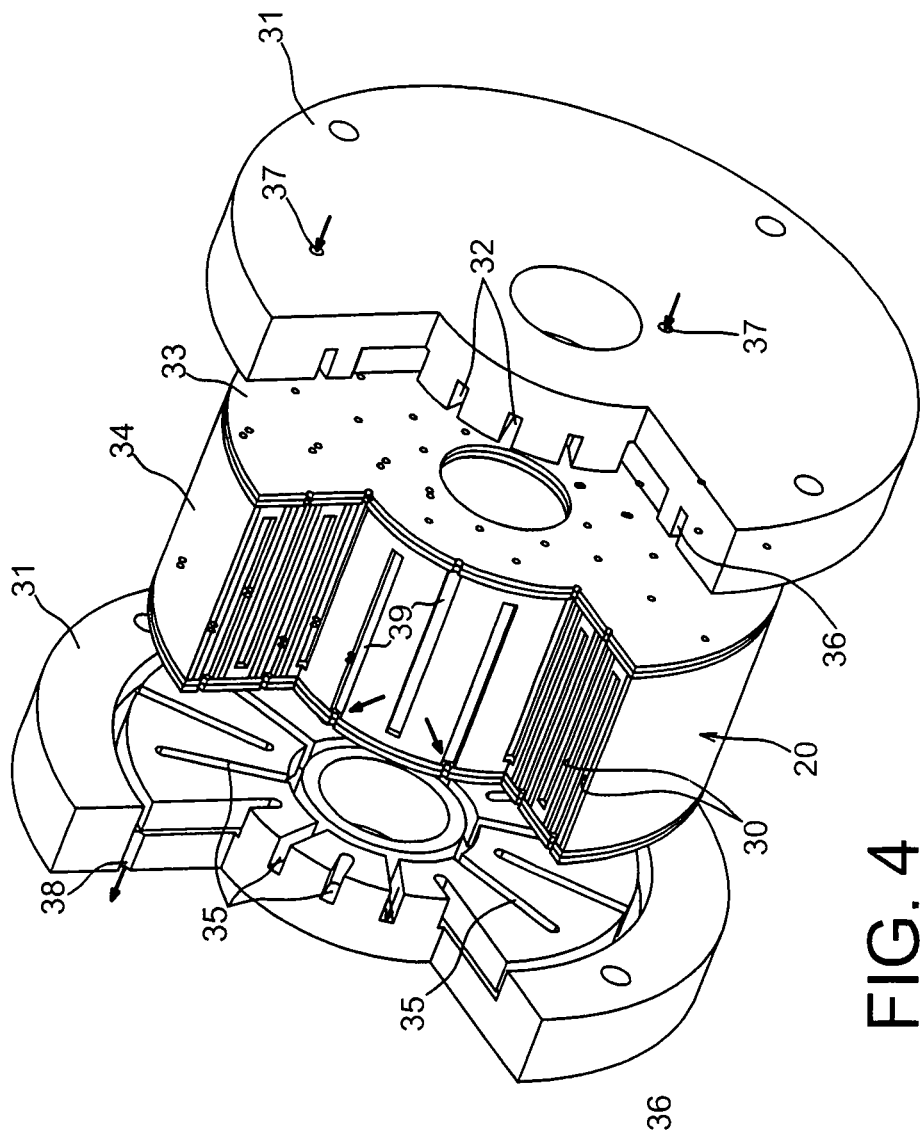
Figure 5:
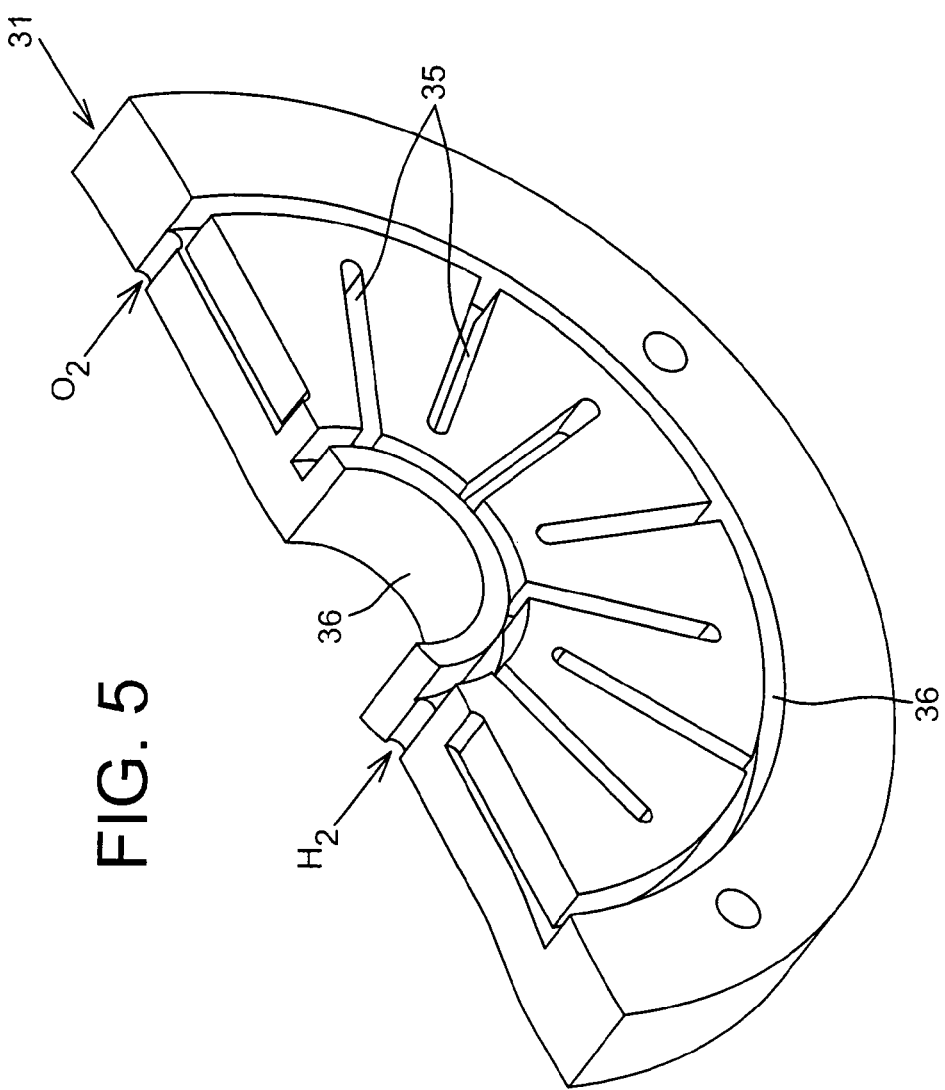
Figure 6:
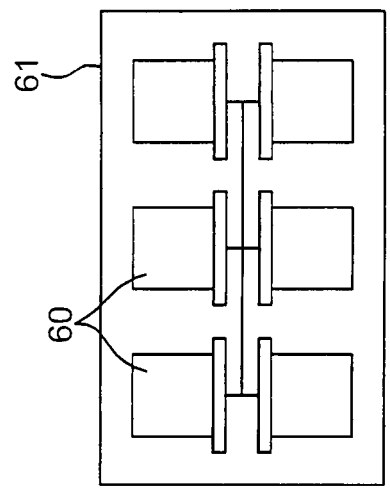

The invention, its different features and embodiments will be better understood upon reading the following detailed description, which is accompanied by several figures respectively illustrating:

FIGS. 1A, 1B and 1C, a first type of base structure for fuel cells according to the prior art;

FIG. 2, a second type of base structure of fuel cells according to the prior art;

FIG. 3, in a rear and top view, the principle of the base structure of a fuel cell module according to the invention;

FIG. 4, in an exploded rear and top view, a first embodiment of a fuel cell module according to the invention;

FIG. 5, in a rear and top view, a case used in this first embodiment of the invention, and FIG. 6, in a schematic sectional view, a fuel cell unit using modules according to the invention.

DETAILED DESCRIPTION OF SEVERAL EMBODIMENTS OF THE INVENTION

With reference to FIG. 3, an elementary fuel cell module according to the invention consists of a concentric stack of at least two concentric elementary cells connected through an interconnector. Each elementary cell itself consists of an anode 21, of an electrolyte 22 and of a cathode 23. Thus, in this FIG. 3, three elementary cells are illustrated, connected through two interconnectors, plus two additional interconnectors 24 inside and outside of the thereby formed tube.

More specifically, the central tube consists of a first interconnector 24 and plays the role of a current collector and at the same time of a mechanical support. It forms the first pole of the fuel cell. On this central tube, is located an electrode (here an anode 21), followed by the electrolyte 22 and the second electrode (a cathode 23). An interconnector 24 will provide the contact with the next elementary cell, no gap remaining between two of these elementary cells. Each elementary cell is therefore made up from the same stack.

At the periphery of the assembly, an additional interconnector 24 is used as a current collector and forms the second pole of the cell.

The diameter of the internal tube formed by the first interconnector 24 may be between 5 and 1,000 mm. The number of thereby stacked elementary cells may be between 2 and 100. The external dimensions of the stack depend on the number of cells and on the thickness of the layers forming it. The length of the tube may be between 10 and 1,000 mm. The concentric elementary cells do not all have the same surface, which causes operating points to differ from one cell to the other. If need be, provision may be made for reducing the surfaces of the cells located towards the periphery of the assembly, in order to reduce the gaps between the different successive surfaces. This may be achieved by reducing the height of the tubes as the radius increases, or by masking a portion of the surface of the electrode so that it is no longer active.

The cylindrical tubular geometry is selected as an example in the present description. However, other types of tubular sections, non-cylindrical, may be imagined which would enter within the scope of the present invention, i.e., square, quadrilateral or polygonal sections.

With reference to FIG. 4, the complete fuel cell module according to the invention therefore mainly comprises a structure 20, as described earlier and with reference to FIG. 3, placed centrally. It is surrounded by two distribution or recovery cases 31 intended to ensure gas flow. It is seen that on the right distribution or recovery case 31, two holes 37 are provided on its surface. They are used for letting in the gases, i.e., hydrogen, and oxygen in the form of air. With circular 36 and radial 35 channels, both of these gases may be transported facing a large series of holes provided on a distribution plate 33 placed on either side of the base structure 20. As the latter consists of many layers, globally referenced as 30, forming a stack of several base cells of a basic fuel cell, the holes of the distribution plates 33 are located facing the elements to be fed with gas, the respective porous cathode and anode of these cells. In the left distribution or recovery case 31 are located the same circular 36 and radial 35 channels with which various gases may be collected, resulting from the production of electric current. With at least one discharge hole 38 located on the second distribution case 31, these residual gases may be discharged out of the module. The distribution plates 33 act as a gasket, because they are used for providing the seal between the case 31 and the structure 20.

As this FIG. 4 is a cut-away figure, a possible structure of the interconnectors may be shown. Indeed, a longitudinal distribution channel 39 is located facing each hole of the distribution plate 33. In a same interconnector, these longitudinal distribution channels 39 are implanted alternately to both distribution plates 33. Thus, as the electrodes are porous, the introduced gas fuels may diffuse inside the material making up each of these electrodes, in the way illustrated by the two tilted arrows.

It is also contemplated that in another configuration, a single hole for supplying the plate 33 with gas should be provided for each electrode, unlike what is illustrated in this FIG. 4.

In the case illustrated in the latter, flow of the gases mainly occurs in the axial direction, this being facilitated by the longitudinal distributing channels 39 provided in the interconnectors. However, a helicoidal geometry of these interconnectors may be contemplated in order to give a slightly helicoidal component to the general flow of the gases in the electrodes.

In the case of FIG. 4, flow of these gases occurs in parallel and in the same direction. The residual gases may thereby be discharged into a single recovery case 31 at the same time at the same place. However, an opposing flow may of course be contemplated, i.e., a crossed stream of both gases, the residual gases being recovered in each of the two distribution cases 31 separately.

Such an architecture has two main advantages which are: significant gain as regards ohmic losses and facilitating the seal. Indeed, as the current lines are radial, the current passes through the layers in their thickness, in an identical way as with the planar architecture illustrated in FIG. 2. This avoids semi-circumferential travel like in the tubular architecture described by means of FIGS. 1A, 1B and 1C. With this, significant reduction of the ohmic losses in the stack may therefore be achieved. Further, the sealing problems are brought back to both of the internal faces of the distribution cases 31, facing the distribution plates 33.

FIG. 5 in a slightly easier way, shows the internal faces of the distribution casins 31. Indeed, the radial channels 35 and the circular channels 36 of FIG. 4 are again found in this FIG. 5. Such a distribution case should be provided in a material for which the expansion coefficient is close to that of the other components of the cell. Further, it should withstand corrosion. An exemplary embodiment of such a distribution case 31 consists of machining a zirconia block and possibly coating it with an insulating and anti-corrosive material.

The use of standard materials is provided for making the interconnectors which are metal, i.e., in an alloy of the type based on nickel. The porous anode is ceramic-metal, a so-called "cermet" (typically: yttriated zirconia+nickel). An yttriated zirconia may be used for forming the electrolyte, whereas lanthanum manganite doped with strontium may be used for making the cathode. This is only an exemplary embodiment, other materials may be used.

The contemplated method for making the stack, as illustrated in FIG. 3 consists of successively making the layers in order to obtain a single-piece module.

This method uses plasma projection. A central tube in an interconnector material is used as support. It may be grooved on its outer surface if need be and for creating the longitudinal distribution channels, as illustrated in FIG. 4. In this case, these channels should be blocked for projecting the following layer. Provision is then made for successively projecting different layers. The first layer is the one forming the anode or the cathode in a porous material. The thickness of this layer is between 10 and 1,000 μm. It may be of interest to densify the end areas, in order to simplify the seals and the supply with combustible gas. This may be made by adjusting the projection parameters.

Next, an electrolyte layer in a dense material is projected. The thickness of this layer is between 10 and 500 μm. This layer should of course be gas-proof.

A cathode or anode layer in a porous material is then deposited under the same conditions as for the first electrode.

Finally, an interconnector is always deposited by projection. If the latter has to include channels, for example longitudinal distribution channels, masks are deposited on the previous layer. Channels are thereby obtained on the internal side of the interconnector. Projection continues until a continuous and dense layer with sufficient thickness is obtained. Masks are again deposited in order to make the channels on the external side of the interconnector.

These four operations are repeated a certain number of times until the desired number of layers is reached.

The thereby obtained stack is a single piece, providing mechanical support of all of the elementary cells, regardless of their thicknesses.

With reference to FIG. 6, several elementary modules 60 of fuel cells are assembled in a thermally insulated chamber 61, in order to keep these modules at the operating temperature. This chamber 61 should comprise passages for letting the gases through, both for the inlet and the outlet, the residual gases being discharged alone or mixed.

It is provided that the gases should be brought inside the modules by pipes of sufficient length so that these gases are pre-heated before their use. The residual gases exiting from the modules may be mixed and burned inside the chamber 61 or be brought by pipes to the outside of the latter. In one example, the residual gases are recovered at the outlet separately, whereas the admission pipes for inflowing gases cross the core of the cell so that the gases are pre-heated therein.

Electrical connections are provided between the modules, with the knowledge that the internal face of a module is one of the poles of the cell, the external face being the second one.

The operating temperature of such an assembly may be 750° C. It is thus possible to obtain a complete cell, consisting of an assembly of several modules, in order to obtain a desired voltage and power. The whole is confined in a volume with strongly reduced losses as compared with existing solutions.

The invention claimed is:

1. A fuel cell module consisting of a stack of a plurality of cells with each cell composed of multi-layers corresponding to an anode, a cathode and an electrolyte with each of the layers of each cell superimposed upon one another such that all of the cells in the stack lie coaxial and concentric to one another within a tubular architecture and with the concentric cells connected through interconnectors, characterized in that the superimposed cells in the stack are separated by interconnectors located between the superimposed cells with the fuel cell module forming a structure having a distribution case disposed on opposite ends of the structure facing the layers of each cell, with the distribution case having gas supply means comprising radial channels opening from at least one surface of the distribution case adjacent each opposite end of the structure.

2. The module according to claim 1, characterized in that the module in cross-section is cylindrical.

3. The module according to claim 1, further characterized in that it comprises a gasket located between each distribution case and the concentric cells, except for distribution openings provided by said gas supply means.

4. The module according to claim 1, characterized in that the anode and the cathode are porous.

5. The module according to claim 1, characterized in that it comprises a distribution plate pierced with holes facing the electrodes to be supplied with gas, on either side of the stack, and comprising longitudinal interconnectors having alternating inlet and outlet gas distribution channels.

6. The module according to claim 1, characterized in that the interconnectors have a helicoidal shape.

7. The module according to claim 1, characterized in that the cases are in zirconia.

8. A method for making a module according to any of claims 1 to 6, this module being a single piece, characterized in that the making is carried out by plasma projection from a central tube having the function of interconnectors, the different successive phases being the following:

projecting on an interconnector (24, 34, 44) either one of the anode (21) and cathode (23) in porous 20 material;
projecting the dense electrolyte (22);
projecting the second one of the anode (21) and cathode (23); and
projecting an interconnector (24),
the process being renewed as many times as desired for stacking the cells.

9. The method according to claim 8, characterized in that as the interconnector(s) (39) should be grooved in order to be able to form longitudinal fuel distribution channels (39), these channels are blocked before projecting the next layer.

10. A fuel cell unit consisting of several modules (60) according to any of claims 1 to 7, confined in a thermally insulated chamber (61) and having at least an inlet and outlet passage for combustible gases.

11. A method for making a module according to claim 2, this module being a single piece, characterized in that the making is carried out by plasma projection from a central tube having the function of interconnectors, the different successive phases being the following:
projecting on an interconnector (24, 34, 44) either one of the anode (21) and cathode (23) in porous material;
projecting the dense electrolyte (22);
projecting the second one of the anode (21) and cathode (23); and
projecting an interconnector (24),
the process being renewed as many times as desired for stacking the cells.

12. A method for making a module according to claim 3, this module being a single piece, characterized in that the making is carried out by plasma projection from a central tube having the function of interconnectors, the different successive phases being the following:
projecting on an interconnector (24, 34, 44) either one of the anode (21) and cathode (23) in porous material;
projecting the dense electrolyte (22);
projecting the second one of the anode (21) and cathode (23); and
projecting an interconnector (24),
the process being renewed as many times as desired for stacking the cells.

13. A method for making a module according to claim 4, this module being a single piece, characterized in that the making is carried out by plasma projection from a central tube having the function of interconnectors, the different successive phases being the following:
projecting on an interconnector (24, 34, 44) either one of the anode (21) and cathode (23) in porous material;
projecting an interconnector (24),
the process being renewed as many times as desired for stacking the cells.

14. A method for making a module according to claim 5, this module being a single piece, characterized in that the making is carried out by plasma projection from a central tube having the function of interconnectors, the different successive phases being the following:
projecting on an interconnector (24, 34, 44) either one of the anode (21) and cathode (23) in porous material;
projecting the dense electrolyte (22);
projecting the second one of the anode (21) and cathode (23); and
projecting an interconnector (24),
the process being renewed as many times as desired for stacking the cells.

15. A method for making a module according to claim 6, this module being a single piece, characterized in that the making is carried out by plasma projection from a central tube having the function of interconnectors, the different successive phases being the following:
projecting on an interconnector (24, 34, 44) either one of the anode (21) and cathode (23) in porous material;
projecting the dense electrolyte (22);
projecting the second one of the anode (21) and cathode (23); and
projecting an interconnector (24),
the process being renewed as many times as desired for stacking the cells.

16. A fuel cell unit consisting of several modules according to claim 2, confined in a thermally insulated chamber and having at least an inlet and outlet passage for combustible gases.

17. A fuel cell unit consisting of several modules according to claim 3, confined in a thermally insulated chamber and having at least an inlet and outlet passage for combustible gases.

18. A fuel cell unit consisting of several modules according to claim 4, confined in a thermally insulated chamber and having at least an inlet and outlet passage for combustible gases.

19. A fuel cell unit consisting of several modules according to claim 5, confined in a thermally insulated chamber and having at least an inlet and outlet passage for combustible gases.

20. A fuel cell unit consisting of several modules according to claim 6, confined in a thermally insulated chamber and having at least an inlet and outlet passage for combustible gases.

21. A fuel cell unit consisting of several modules according to claim 7, confined in a thermally insulated chamber and having at least an inlet and outlet passage for combustible gases.

* * * * *